United States Patent [19]

Bourgonje et al.

[11] Patent Number: 4,672,606

[45] Date of Patent: Jun. 9, 1987

[54] METHOD, STATION AND SYSTEM FOR THE TRANSMISSION OF MESSAGES IN THE FORM OF DATA PACKETS

[75] Inventors: Wouter Bourgonje; Daniël J. G. Janssen; Willem A. van Reede; Johannes A. A. Vossen, all of Eindhoven, Netherlands

[73] Assignee: U.S. Philips Corporation, New York, N.Y.

[21] Appl. No.: 756,141

[22] Filed: Jul. 17, 1985

[30] Foreign Application Priority Data

Jul. 27, 1984 [NL] Netherlands ........................ 8402364

[51] Int. Cl.⁴ .............................................. H04J 3/26
[52] U.S. Cl. ......................................... 370/85; 370/95
[58] Field of Search ...................... 370/85, 89, 86, 94; 340/825.5, 825.51

[56] References Cited

U.S. PATENT DOCUMENTS 4,536,875 8/1985 Kume et al. .......................... 370/85
4,586,176 4/1986 Miyao ................................... 370/85

Primary Examiner—Douglas W. Olms
Attorney, Agent, or Firm—David R. Treacy

[57] ABSTRACT

Data packets are transmitted over a time-division multiplex system with CSMA-CD connecting multiple stations and having a signaling channel and message-switch channels. Collisions caused by simultaneous attempts by two or more stations to access the system for transmission are limited to the signaling channel, and are remedied by a retransmission procedure in which the unique station address number determines the frame number in which retransmission may start. This procedure guarantees that a station can access a message-switched channel within a short period of time.

11 Claims, 6 Drawing Figures

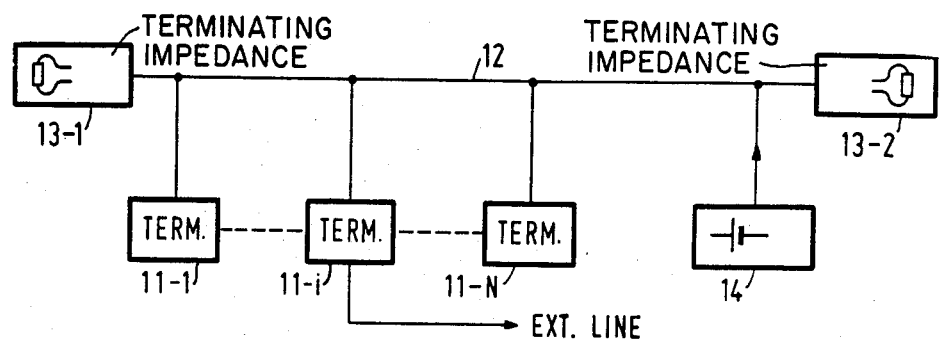
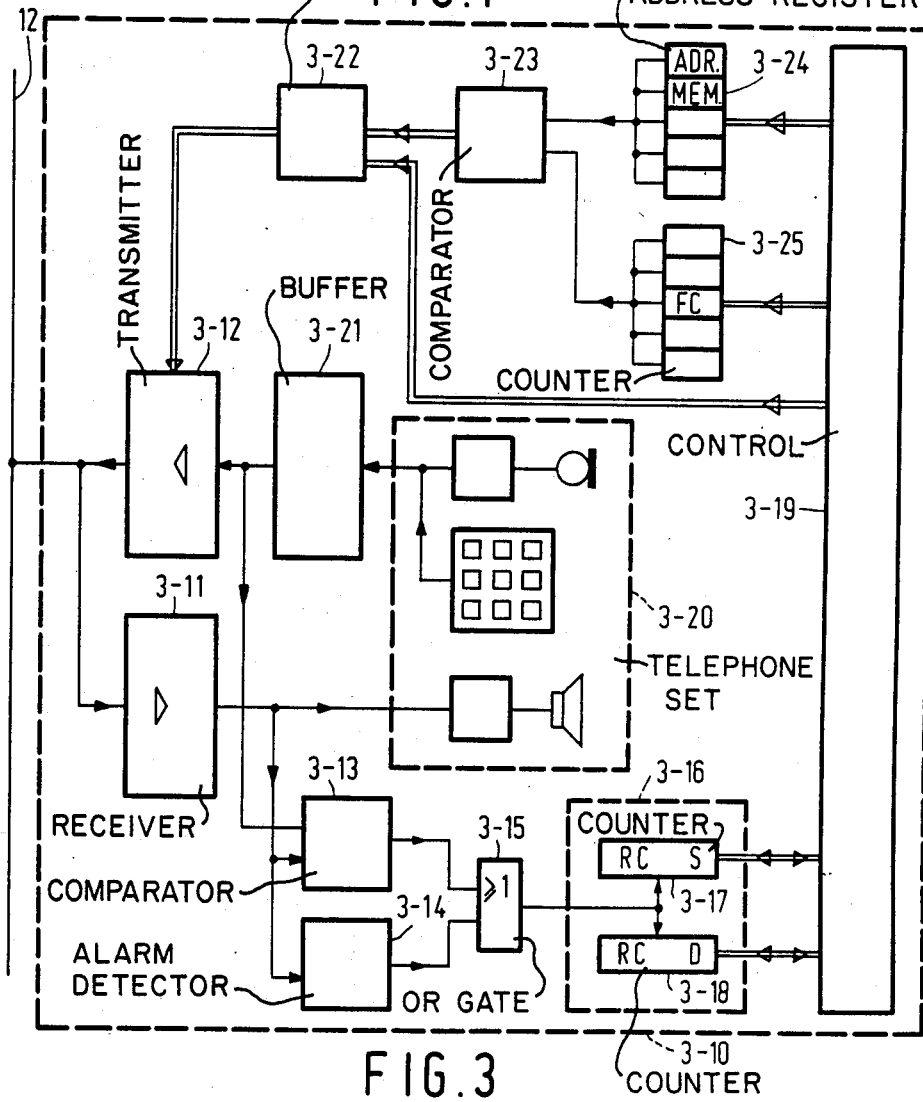
FIG. 1
FIG. 3

METHOD, STATION AND SYSTEM FOR THE TRANSMISSION OF MESSAGES IN THE FORM OF DATA PACKETS

The invention relates to a method of transmitting messages formed by data packets between stations via a common communication channel, and in particular to the method in which data packets are assigned to and transmitted in corresponding time slots in consecutive frames of a time-division multiplex system.

(a) each station continuously checks the traffic state (free or busy) of the channel, (b) those stations which have a data packet ready for transmission transmit this packet after they have detected the traffic-free state of the channel, (c) each transmitting station compares the content of the data packet transmitted by this station to the content of the data packets present in the communication channel to check those packets for multilations, (d) each station detecting mutilation of its data packet terminates the transmission of further data packets of the message, and (e) then those stations which have detected mutilation of the data packets adopt a procedure for repeated transmission of their data packets.

The invention also relates to a station for performing that method and a system of stations having a common communication channel.

Such a method, station and system are disclosed in U.S. Pat. No. 4,063,220.

The manner described there for the stations to access the communication channel is known as the CSAMA-CD protocol (Carrier Sense Multiple Access with Collision Detection). If in such a system several stations start transmitting data packets simultaneously, a collision state occurs which is detected by the transmitting stations because they detect inequality between the data transmitted by them and the data simultaneously present in the communication channels. Repeated transmission of the data packets must then occur in accordance with a retransmission procedure so as to accomplish undisturbed transmission.

In retransmission procedure taught in U.S. Pat. No. 4,063,220, after collision a data packet must wait for a waiting time which is directly ascertained after the collision, before transmission can be resumed. The waiting times in the stations of this system are statistically distributed, the waiting time being influenced by a weighting factor which depends on the number of times collision has occurred on transmission of a data packet.

Because of the random character of the length of the waiting time, it is possible that the overall waiting time becomes very long; in practice this means that the access to the communication channel of a data packet after collision is not absolutely certain.

SUMMARY OF THE INVENTION

The object of the invention is to provide a method of the type described in the opening paragraph, with which access of collided data packets to the communication channel is guaranteed.

According to the invention, the method is therefore characterized in that (a) each station has an address number which unambiguously identifies this station, (b) after mutilation of the data packets has been detected, consecutive numbers are assigned in each station to a first number of consecutive frames, and (c) the number of the frame in which the repeated transmission of the data packets of a station starts is equal to at least a part of the address number of that station.

One possibility is to select, as a number of consecutive frames to be numbered, the number identical to the number of stations which can use the communication channel. In that case it is certain that a data packet can be transmitted at the first re-transmission without collision.

An alternative possibility is to limit the number of frames which are to be counted down after collision. An embodiment of the method in which this feature is used, is therefore characterized in that, (d) after mutilation of the data packets has been detected, consecutive numbers are assigned in all stations to a second number of consecutive frames which precede in time the first number of consecutive frames and (e) the number of the frame of the second number in which, if necessary, a second re-transmission of the data packets of a station starts, is equal to the other part of the address number of that station.

As only a portion of the address number is used for assigning of the frame for first retransmission, there is a risk that a collision occurs again at the first retransmission, namely between two stations which have the relevant portion of the address number in common. After such a repeated collision a subsequent retransmission is effected of the data packets which were involved in this repeated collision. This subsequent retransmission then occurs in frames of the second number. In these last frames collision can occur because the other portions of the address numbers of the relevant stations are mutually different.

In some communication systems different types of messages are transmitted, and a distinction is desired between the transmissions of the different types of messages. Such a situation occurs, for example, if the communication channel is a channel which is used for both signalling purposes for stations such as telephone sets, and the transmission of less urgent messages such as, for example, messages for telemetry purposes.

A method which makes a distinction between different types of messages on the transmission of messages is therefore characterized in that (1) data packets of first and second types are transmittable by the stations, these types differing from each other by their contents and (2) in the traffic-free state, the first and the second frames of consecutive pairs of frames are alternately available for the transmission of a packet of the first and second type, respectively.

On transmission of different types of messages it may be desirable to give one type priority over another type. A method which, before proceeding to retransmission of one type of messages, first enables the transmission of non-collided messages of a different type, is therefore characterized in that (a) data packets of a first and a second type are transmittable by the stations, these types differing from each other by their contents, (b) each station can start the transmission of data packets of the first type in a frame located between detection of mutilation of a data packet and the subsequent assigning of consecutive numbers to consecutive frames, and (c) in each station a flag is placed which indicates the transmission of a data packet of the first type in that frame.

Providing the flag may prevent non-collided messages of a first type from repeatedly preceding the retransmission of messages of the same type. It also prevents messages of the second type waiting for retransmission from interfering with retransmission of messages of the first type.

Not only the collision of messages but also other causes such as, for example, noise or externally induced interferences in the communication channel can lead to messages being transmitted in a mutilated condition without this being detected by the transmitting station. Also in such a case repeated transmission of the relevant message is required.

A method with which retransmission is accomplished in such cases is therefore characterized in that, (1) after transmission of the message has been completed the receiving stations perform an error check, (2) in each station after the transmission of the message has been completed, consecutive numbers are assigned to a third number of consecutive frames, which number of frames is immediately subsequent to the last data packet of the message, (3) each station which has detected an error during the error check transmits an alarm signal in a predetermined frame of the third number of frames and (4) in response to the alarm signal, the station which has transmitted the error-containing message starts a procedure for repeated transmission. This procedure for repeated transmission may proceed as described above for the case of collision.

The invention and its advantages will be described in detail by way of example with reference to the accompanying drawing.

BRIEF DESCRIPTION OF THE DRAWING

FIG. 1 shows a system of stations connected to a common bus;

FIG. 3 shows a block circuit diagram of a station of FIG. 1 in which only the functional blocks relevant to the invention are shown;

DESCRIPTION OF THE PREFERRED EMBODIMENT

Figure 2:
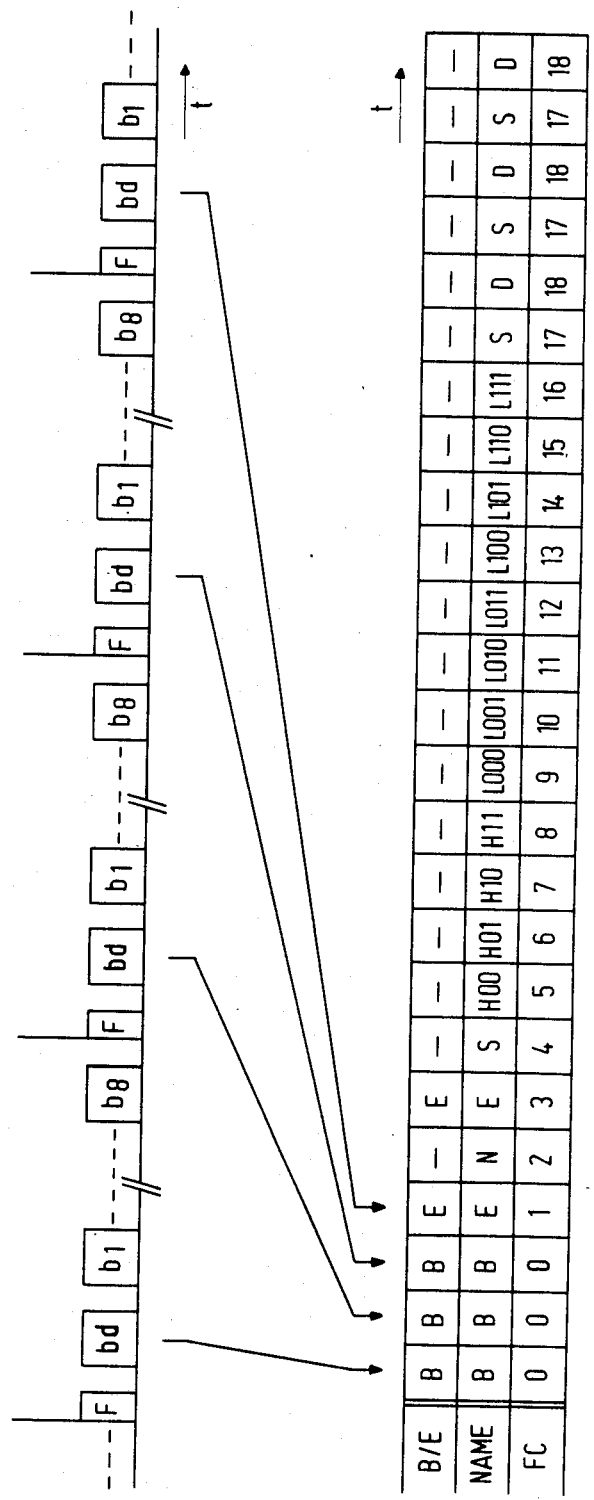
FIG. 2 is a diagrammatic representation of the frame structure of the time-division multiplex system and the frame sequences on re-transmission.

FIG. 1 shows a system of a number of stations 11-1 to 11-N connected to a common bus 12. These stations may be telecommunications terminals such as, for example, telephone sets or telex apparatus. They may alternatively be data-processing apparatus such as, for example, word processors or personal computers. Sensor stations for safety purposes or for process control, such as for example fire sensors or temperature sensors for room heating can also function as stations in this system.

Each of these stations has an address number which unambiguously identifies this station within the system. This address number is important for the selection, still to be described in the sequel, of a main station for synchronizing purposes and for the retransmission, also to be further described in the sequel, of message which were mutilated during transmission.

Bus 12 is a two-wire conductor whose ends are terminated by terminating impedances 13-1 and 13-2. A direct current supply source 14 can be connected to bus 13 for feeding the stations. The signal transmission via the bus is effected in binary encoded form. One of these two binary values (for example "0") can be represented by the electrically floating state of the bus while the other binary value ("1") is represented by a voltage difference. The advantage of this signal form is that if two stations transmit simultaneously, the "0" of one station is suppressed by the "1" of the other station. This suppression facilitates detection of the collision situation by the station transmitting the "0".

The communication over via the bus proceeds via communication channels which are made available by the use of a time-division multiplex system. Communication in such a system requires the time-division multiplex frames in all the connected stations to be mutually synchronized. This synchronization is obtained by means of a synchronizing signal transmitted in a synchronizing channel by one of the stations, the main station.

Because of the selection procedure followed during the selection of the main station, none of the stations is excluded from the possibility of being selected as the main station. According to this procedure, in each station one unit is added to the address number in a continuing series of additions until a predetermined final value has been reached in one station, which then becomes the main station. Should that station be removed from the bus, then this selection procedure is performed again until a new main station has been selected.

There is a possibility that the station is not only connectable to the bus but also to an external communication channel, (for example a private or public telephone network), that external communication channel also being formed by a sequence of time slots. It is then necessary to synchronize the bus with the external communication channels. As for this purpose the stations having an external connecting feature must be given priority during the selection procedure of the main station, these stations comprise an additional "address bit", so that these stations always have a higher address number than the other stations.

In FIG. 2 the upper diagram shows the frame structure of the time-division multiplex system. The frame repetition rate is adapted to the standard 8 kHz sampling rate for digital speech transmission, so that a frame period of 125 μs is obtained. The frame is divided into ten channels, namely one synchronizing channel F, one half-duplex channel (bd) for system control (signalling) and for message-switched data transmission, and eight half-duplex channels $b_1$ to $b_8$ for circuit-switched speech and data transmission. Thus a maximum of, for example, four telephone conversations are simultaneously possible in this frame structure.

The F-channel for synchronization contains a five-bit word. Each of the remaining channels may contain a nine-bit word, and still leave 4 bit positions unoccupied to offset the delay caused by the required propagation time in the bus conductor. Together with the spaces between the channels, the above-mentioned bit occupation of the channels produces a bit rate on the bus of the order of magnitude of 1 Mbit/s.

So as to indicate that a channel is busy, in each frame of such a busy channel the channel word starts with a "1", referred to as the start bit. This start bit is followed in the same frame by a bit word of four (F-channel) or eight bits (remaining channels). Each station is now capable of detecting the traffic state (free or busy) of a channel by observing the first bit position of that channel in each frame.

Access of a station to a circuit-switched channel must be realized as a result of preceding signalling in the bd-channel. The channel starts by transmitting a message in the bd-channel when this channel is free. This message is formed by a message identification, the address number of that station and two check words, referred to as CRC-bytes (Cyclic Redundancy Check). Since the address number is unique for each station, the transmitting station can ascertain whether another station has simultaneously started the transmission of a similar message. If yes, collision is unavoidable, as all the address numbers are mutually different. Upon an undisturbed transmission of the address number it is certain that no other station has had access to the bd channel. The station which was the sole station transmitting over the bd-channel now consequently is also the sole station accessing one of the channels $b_1$-$b_8$, provided one of these channels is free. Acting thus prevents collision in a circuit-switched channel. Consequently, collisions can only occur on transmission over the bd-channel.

The invention provides a method which is suitable for solving collision problems in such a way that it is ensured that messages involved in a collision can be transmitted without mutilations after this collision. This method is illustrated in the lower diagram of FIG. 2.

The lower diagram of FIG. 2 shows a sequence of frames of the bd-channel. The top row of this diagram illustrates the traffic state, Empty (E) or Busy (B). A dash(-) indicates that such a frame can be both empty and busy. The central row of this diagram shows the name of the several frames. B is a frame being used for the transmission of a byte. E is a frame which is always kept empty. N is a frame in which a receiving station can report by means of an alarm signal (N=NACK, "Not Acknowledged") that the message was multilated on receipt.

The messages in the bd-channel can be distinguished in two types by their function in the system. A first type includes, for example, the messages which form the signalling for the setting-up of a circuit-switched connection between two stations. In a more general sense, the messages providing the system control belong to this first category. The length of these messages is limited, while for their function (system control) a fast transmission is desirable. The second category is formed by messages embodying, for example, the data for telemetry or (slow) data transmission between computers. They may be comparatively long messages having a comparatively low urgency. The first category is referred to as an s-message, the second category as a d-message. On repeated transmission, the transmission procedure in accordance with the invention gives s-messages priority over d-messages. S and D are frames intended for starting the transmission of s-messages and d-messages, respectively. The frames H 00 to L 111 are intended for starting the re-transmission of messages involved in a collision or which were received mutilated.

In the present embodiment it is assumed that 31 stations are connected to the bus having address numbers (binary) 00001 to 11111. A station having address number a b i j k tries to effect its first re-transmission in frame L i j k; there still is a possibility that, in this frame, collision occurs again with another station having the same last three address bits. In that case station a b i j k effects its second re-transmission in frame H a b. Since H-frames are only accessible to stations which previously collided in an L-frame, collision is now impossible since all the address numbers are different (no station has address number 00000) so that the combination L 000 followed by H 00 will not occur during retransmission. The value 00000 is used as the final value in the selection procedure for the synchronizing main station).

The lower row of the diagram of FIG. 2 illustrates the numbering of the several frames. As long as the channel is occupied by the transmission of a message, the frame counter FC is in the zero position. After a message has ended, an empty frame always occurs, which causes the frame counter to increment to 1. (In this empty frame receiving stations can carry out their error check CRC). If a station has detected an error then this station transmits a NACK signal in the frame 2, which causes the transmitting station to effect a retransmission in one of the frames 9 to 16. If during frame 1 no error is detected then frame 2 remains empty. The empty frame 3 is only included because of the lack of computation time and has no further significance for the invention.

Frame 4 in FIG. 2 is intended for the start of new s-messages. This new s-message consequently has priority over retransmission of both d- and s-messages. This realizes the procedence of s-messages over d-messages during retransmission of d-messages. In the event in which such a new s-message takes precedence over other s-messages waiting for re-transmission then in all stations a flag is placed which prevents, after the end of that new s-message, a further new s-message from postponing the retransmission of s-messages again.

The frames 9 to 16 are intended for first retransmissions, the frames 5 to 8 for further retransmissions. In frames 17 and 18 s-messages and d-messages, respectively, can start again.

In the empty traffic state of the bd-channel the frame counter changes-over between counting positions 17 and 18. A station having a message for transmission via the bd-channel takes access to that channel, the frame counter then being adjusted to zero. After the end of the message the frame counter starts counting from zero. If in frame 2 no NACK byte is received, then the frame counter proceeds to 17 and 18, whereafter the counter starts alternating between 17 and 18 ("toggling"). If a NACK byte was indeed received in frame 2 then the station starts retransmission in that L-frame which corresponds to its address number. After that retransmission has ended the frame counter again passes from 0 to 18 and starts toggling.

If during toggling two stations simultaneously start to transmit simultaneously each of the stations detects that its message is mutilated. The stations now stop the transmission of the message and in the next frame send a disturb signal (formed by the NACK-byte consisting of 9 "1"-bits), whereafter the subsequent frame is again kept empty. In that empty frame the counter goes to 1, the other stations detect in frame 1 an error on the basis of their error check and transmit a NACK-byte in frame 2. In the absence of a new s-message in frame 4 retransmission (in the event of collision in an L-frame) is followed by a second retransmission in a H-frame, collision being impossible.

It is however still possible that after a retransmission has ended the transmitting station again receives a NACK-byte in frame 2, namely when the message is mutilated on transmission or when the receiving station is not capable of accepting the message. To distinguish between these two situations a third retransmission is effected, also in the corresponding H-frame. If thereafter a NACK byte is received again, then the transmitting station decides that the receiving station is not capable of accepting the message and terminates further transmission. After the last-NACK-byte (counting position 2) the frame counters in the stations pass once again through the positions up to 18, inclusive and start toggling thereafter.

If, however, during last-mentioned cycling through the frame counter the flag was in the set state (in response to a s-message in frame 4 which started at an earlier stage) then the frame counter returns from position 16 to position 3 and thereafter starts to count up while at the same time the flag is adjusted to the non-set state. The object of this procedure is to offer the d-message (which could not be transmitted in an earlier stage because the flag was in the set state) the opportunity to be transmitted. After the frame counter has returned to position 3 it is still possible that in the subsequent frame 4 an s-message starts again, the flag being set.

FIG. 3 shows a block circuit diagram of a station 3-10 in accordance with the invention, connected to the bus 12. The station comprises a receiver 3-11 which takes signals from the bus and a transmitter 3-12 transmitting signals to the bus. In order to determine equality between the transmitted bits and the bits present on the bus, a channel comparator 3-13 is provided, which is connected to the transmitter input and to the receiver output. An alarm signal detector 3-14 is also provided for detecting alarm signals (NACK-bytes) in the communication channel. The outputs of channel comparator 3-13 and alarm signal detector 3-14 are connected to an OR-gate 3-15, whose output is connected to a counting unit 3-16. This counting unit is constituted by two retransmission counters, one for s-messages 3-17, and one for d-messages 3-18. Both counters are connected to the central control 3-19 of the station for activation by an s-message and a d-message, respectively.

The station further comprises a using unit 3-20 for converting the received information into a form suitable for use. Such a unit may, for example, be in the form of a picture screen, a printer or a circuit of a telephone set. The using unit is shown symbolically for last-mentioned use. Using unit 3-20 transfers the bytes to be transmitted to buffer store 3-21 from which these bytes are transmitted to the bus by transmitter 3-12.

The transmission of the bytes contained in bufferstore 3-21 by transmitter 3-12 must only be effected in predetermined frames, for example a byte of a new s-message is only to start in frame 4 or in frame 18. To enable this frame-selective transmission, energizing means 3-22 are connected to transmitter 3-12, which energize transmitter 3-12 for transmitting the content of buffer store 3-21 in dependence on the position of the frame counter, of the station address number, the type of message (s or d), whether the flag is in the set or the non-set state (when frame 4 is occupied) and on the position of the retransmission counter.

The energizing means 3-22 receive information from counter comparator 3-23 which compares the content of address store 3-24 to the content of frame counter 3-25. This comparison is necessary for selecting the appropriate frame for retransmission; the energizing means also receives further information necessary for this selection from the central control 3-19.

Repeated transmission of a message is necessary on collision of several stations or in the case of error detection by a receiving station. Collision is detected by channel comparator 3-13 which, when it detects inequality of the bits at its two inputs, applies a collision signal to an OR-gate 3-15. When it detects an error, a receiving station reports this by means of an alarm signal (NACK) in frame 2. In response to that alarm signal, alarm signal detector 3-14 applies an alarm indication signal to OR-gate 3-15. In response to one of the two input signals OR-gate 3-15 supplies a signal for increasing the counter position of either s-retransmission counter 3-17 or d-retransmission counter 3-18. A non-zero counting position of these counters triggers the start of the retransmission in one of the frames 5 to 16.

The flow chart of FIG. 1 illustrates how the various counting positions of the frame counter are obtained. In all stations the counting position of the frame counters are equal to each other. The portion of the flow chart located below block 4-2 is passed through once in each frame. The several blocks in the flow chart have the following significance.

| Block no. | caption | Significance |
|---|---|---|
| 4-1 | POWER ON | the bus is made operative by feeding supply energy to the station. |
| 4-2 | SF: = 0 | The non-set state of the flag indicating the start of a s-message in frame 4, is set |
| 4-3 | START | start of the cycle which repeats itself each frame. |
| 4-4 | FRAME SYNC. | test whether the frame generated in the station is in phase synchonism with the frame generated by the synchronizing main station. |
| 4-5 | CH.OCC. | test whether the bd-channel is occupied. |
| 4-6 | FC = 2 | test whether the frame counter is in position 2. |
| 4-7 | FC = 4 | test whether the frame counter is in position 4, |
| 4-8 | SF: = 1 | the flag indicating the start of an s-message in frame 4, is set. |
| 4-9 | FC: = 0 | the frame counter is set to position 0. |
| 4-10 | FC = 18 | test whether the frame counter is in position 18. |
| 4-11 | FC: = 17 | the frame counter is set to position 17. |
| 4-12 | FC: = FC + 1 | the position of the frame counter is incremented by 1 unit. |
| 4-13 | FC = 16 SF = 1 | test whether the frame counter is in position 16 and also whether the flag is set. |
| 4-14 | SF: = 0 FC: = 3 | the non-set state of the flag is set and the frame counter is adjusted to position 3. |
| 4-15 | FC: = 0 | the frame counter is set to the position 0. |

Immediately after the bus has been made operative (4-1), the non-set state of the flag (indicating the start of an s-message in frame 4) is set, whereafter the then subsequent cycle is repeated in each frame.

As long as the locally generated frame is not in synchronism with the bus frame, the frame counter is kept at zero. The frame counter can continue counting after frame synchronization. In counting position 4 an s-message may be transmitted over the bus; if no message is transmitted then the frame counter counts on, alternately to position 17/18 in which an s-message may alternately start.

The channel being occupied and the frame counter being in counting position 2 inevitably denotes a NACK-signal; the frame counter now continues to count via block 4-12. In that case, it no new s-message is started in frame 4, the retransmission field 5 to 16 is cycled through. In one of these frame the collided or multilated message can be retransmitted. The channel being occupied and the frame counter being in position 4 is a sure indication of a new s-message in frame 4; now the flag is set, block 4-8. In all other cases the channel is normally occupied, the frame counter always being kept at 0, block 4-9.

If a flag is set when a channel is not occupied and the frame counter has arrived in counting position 16 (block 4-13), then the non-set state of the flag is set and the retransmission field is once cycled through again, whereafter the frame counter starts toggling between the positions 17 and 18.

Figure 4:
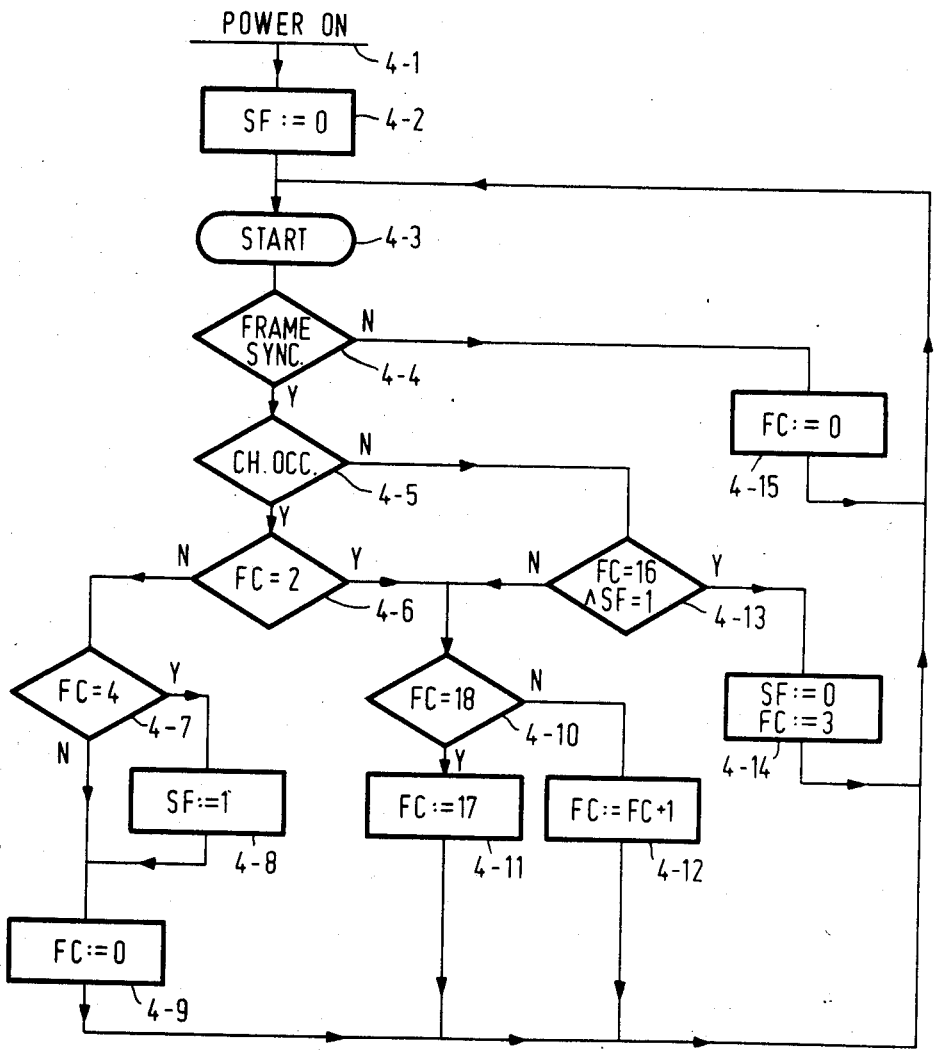
FIG. 4 shows a flow chart illustrating the operation of the frame counter.

The advantage of the method illustrated by the flow chart of FIG. 4 is that any deviations of a frame counter of a given station is corrected automatically without outside action. Such deviations, can, for example, occur because the station is connected to the bus at a later instant than the outer stations, or has been removed from the bus for some time of by externally induced interferences. The frame counter of that station is indeed originally not in synchronism with the other frame counters, (thus this frame counter shows other frame numbers) but at the first occupied frames detected by that station the frame counter will be adjusted to the zero position or the station will cause collision. In the first case synchronization is obtained. In the second case a retransmission procedure is started, also beginning with frame counter position 0, which also accomplishes sychronization. The adopted method renders the frame counting and consequently the access procedure self-repairing.

Figure 5:
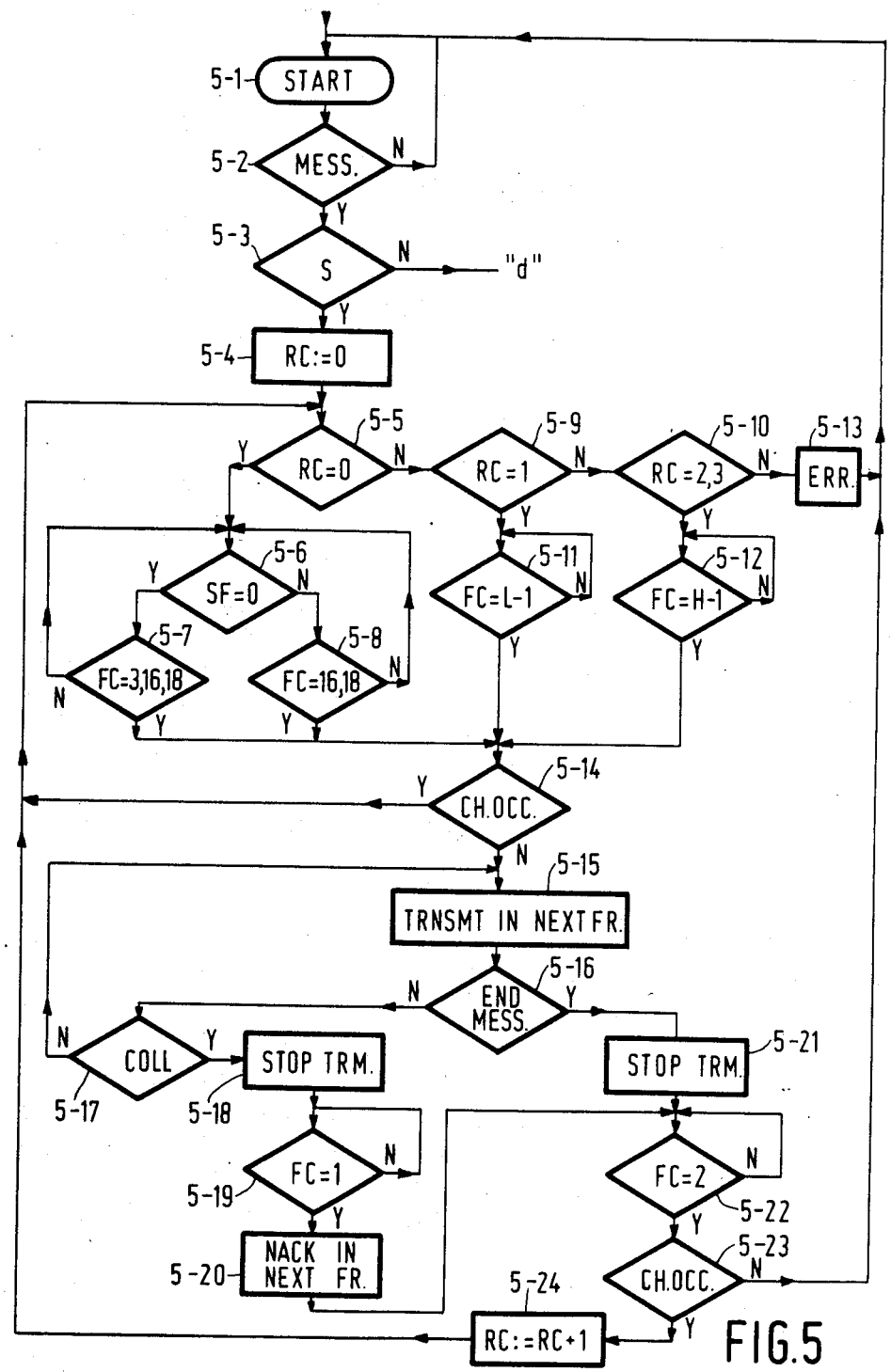
FIG. 5 shows a flow chart which illustrates the access procedure of a first type of messages to one of the communication channels.

The flow chart of FIG. 5 illustrates the access procedure steps for the bd channel when an s-message is to be transmitted by a station. The blocks in this flow chart have the following significance:

| Block no. | Caption | siqnificance |
|---|---|---|
| 5-1 | START | start of the access procedure. |
| 5-2 | MESS. | test whether a message is ready for transmission. |
| 5-3 | S | test whether the message ready for transmission is an s-message. |
| 5-4 | RC: = 0 | the retransmission counter for s-messages is set to 0 |
| 5-5 | RC = 0 | test whether the retransmission counter for s-messages is in the zero position. |
| 5-6 | SF = 0 | test whether the flag is in the non-set state. |
| 5-7 | FC = 3,16,18 | test whether the frame counter is in one of the counting positions 3, 16 or 18. |
| 5-8 | FC = 16,18 | test whether the frame counter is in one of the positions 16 or 18. |
| 5-9 | RC = 1 | test whether the s-retransmission counter is in counting position 1. |
| 5-10 | RC = 2,3 | test if the s-retransmission counter is in one of the counting positions 2 or 3. |
| 5-11 | FC = L-1 | test whether the frame counter is in one of the counting positions 8 to 15 and whether at the same time that counting position minus 8 is equal to the number formed by the three least significant bits of the address number. |
| 5-12 | FC = H-1 | test whether the frame counter is in one of the position 4 to 7, and whether at the same time that counting position minus 4 is equal to the number formed by the two most significant bits of the address number. |
| 5-13 | ERR. | decide whether the receiver is not capable of accepting the message. |
| 5-14 | CH.OCC | test whether bd-channel is occupied |
| 5-15 | TRNSMT IN NEXT FR. | transmit the message in the next frame. |
| 5-16 | END MESS. | test whether the last byte of the message has been reached. |
| 5-17 | COLL. | test whether collision has been detected. |
| 5-18 | STOP TRM | stop the transmission. |
| 5-19 | FC = 1 | test whether the frame counter is in the counting position 1. |
| 5-20 | NACK IN NEXT FR. | send NACK-signal in the next frame. |
| 5-21 | STOP TRM. | stop the transmission. |
| 5-22 | FC = 2 | test whether the frame counter is in counting position 2. |
| 5-23 | CH.OCC | test whether the bd-channel is occupied. |
| 5-24 | RC: = RC + 1 | increment the counting position of the s-retransmission counter by one unit. |

After the start of the access procedure, the message to be transmitted is tested whether it is an s-message. If no, then the access procedure for d-messages is followed, which is symbolically shown in FIG. 5 in block 5-3 by "d"; the d-procedure is then started at the input of block 6-4, FIG. 6. If yes, then the message is transmitted, the path 5-4, 5-5, 5-6, 5-7, 5-14, 5-15, 5-16, 5-17, . . ., 5-15, 5-16, 5-21, 5-22, 5-23, 5-1 being followed further.

If after transmission of the message collision occurs (after first the same path from block 5-4 to 5-16 has been followed) the path is followed via the block 5-16, 5-17 to 5-20, 5-22, 5-23, 5-24 and back to 5-5. For the first retransmission the path is now chosen which leads from 5-5 via the blocks 5-9, 5-11, 5-14, 5-15, 5-16, 5-17. Let it be assumed that during this first retransmission collision occurs again, so that the path is continued via the blocks 5-18, 5-19, 5-20, 5-22, 5-23, 5-24, and back again to 5-5. For the second retransmission the path is taken from block 5-5 via the blocks 5-9, 5-10, 5-12, 5-14, 5-15, 5-16, 5-17. At this stage collision is impossible (the frame counter is now in the H-range of FIG. 2), so that after termination of the message (block 5-16) the path is continued via blocks 5-21 and 5-22. If now in frame 2 (block 5-22) the channel is found to be occupied (5-23), then this must be a NACK-signal reporting mutilated reception. As a result, now the retransmission counter is now adjusted to position 3 (block 5-24) and this last path is again continued from block 5-5 to block 5-23. If now a NACK signal indicating multilated reception is again detected, then the retransmission counter is adjusted to 4, as a result of which the path 5-5, 5-9, 5-10, 5-13 back to 5-1 is followed, an error being reported (5-13) to the central control of the station.

Figure 6:
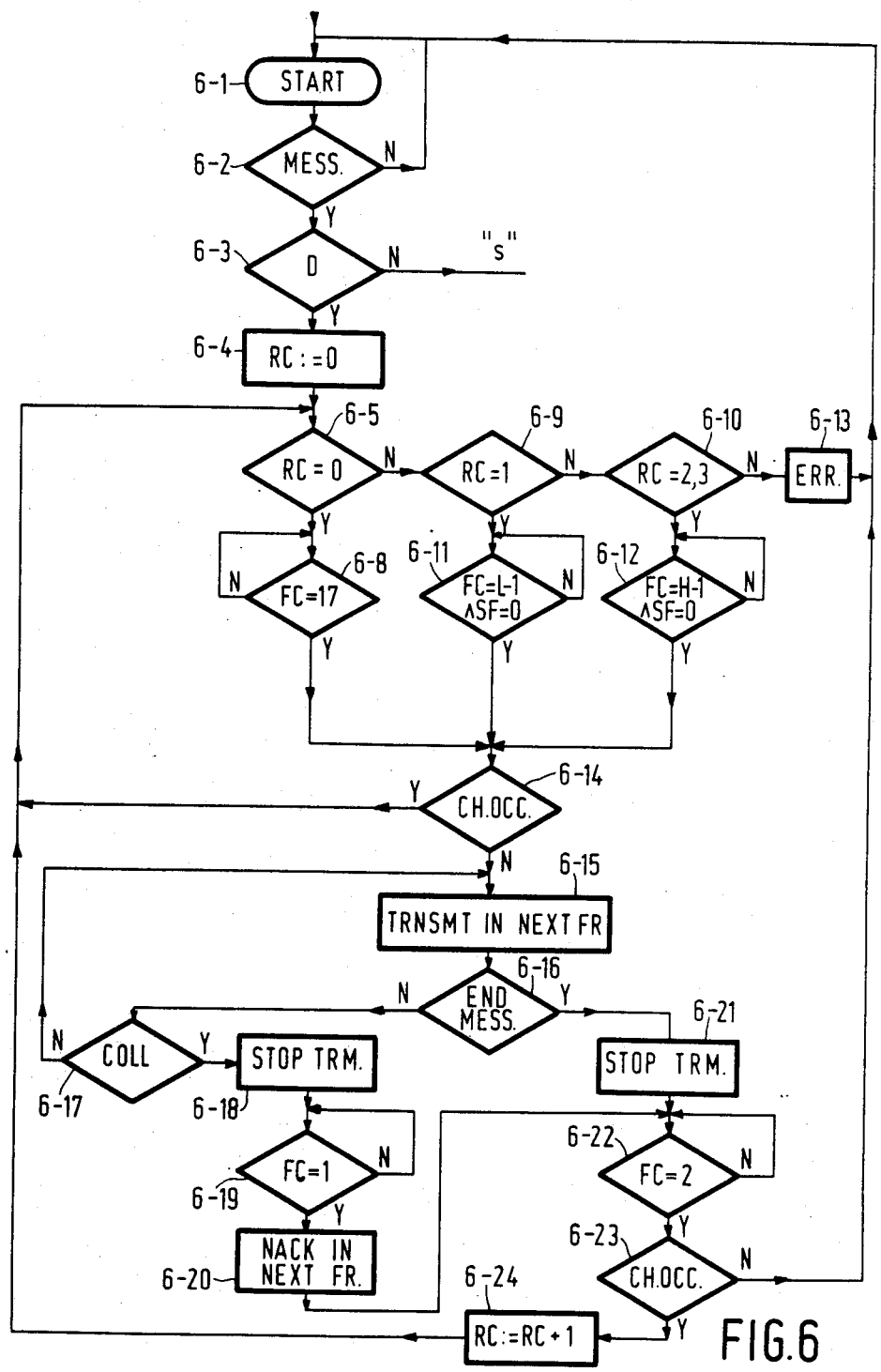
FIG. 6 shows a flow chart illustrating the access procedure of a second message type to the same communication channel.

The flow chart of FIG. 6 shows the course of the access procedure to the bd-channel of a d-message to be transmitted by a station. The blocks in this flow chart have the following significance:

| Block no. | Caption | significance |
|---|---|---|
| 6-1 | START | start of the access procedure. |
| 6-2 | MESS. | test whether a message is ready for transmission. |
| 6-3 | D | test whether the message ready for transmission is a d-message. |
| 6-4 | RC: = 0 | the retransmission counter for d-messages is set to 0. |
| 6-5 | RC = 0 | test whether the retransmission counter for d-messages is in the zero position. |
| 6-8 | FC = 17 | test whether the frame counter is in position 17. |
| 6-9 | RC = 1 | test whether the d-retransmission counter is at 1. |
| 6-10 | RC = 2,3 | test whether the d-retransmission counter is in one of the positions 2 or 3. |
| 6-11 | FC = L-1 SF = 0 | test whether the frame counter is in one of the counting positions 8 to 15, whether at the same time the counting position minus 8 is equal to the number formed by the three least-siginificant bits of the address number and whether at the same time the flag is in the non-set state. |
| 6-12 | RC = H-1 SF = 0 | test whether the frame counter is in one of the positions 4 to 7, whether at the same time the counting position minus 4 is equal to the number formed by two most significant bits of the address number and whether at the same time the flag is in the non-set state. |
| 6-13 | ERR. | decide whether the receiver is not capable of accepting the message. |
| 6-14 | CH.OCC | test whether the bd-channel is occupied |
| 6-15 | TRNSMT IN NEXT FR. | transmit the message in the next frame. |
| 6-16 | END MESS. | test whether the last byte of the message has been reached. |
| 6-17 | COLL. | test whether collision has been detected. |
| 6-18 | STOP TRM | terminate the transmission. |
| 6-19 | FC = 1 | test whether the frame counter is in the counting position 1. |
| 6-10 | NACK IN NEXT FR. | send NACK-signal in the next frame. |
| 6-21 | STOP TRM. | terminate the transmission. |
| 6-22 | FC = 2 | test whether the frame counter is in counting position 2. |
| 6-23 | CH.OCC. | test whether the bd-channel is occupied. |
| 6-24 | RC: = RC + 1 | increment the counting position of the d-retransmission counter by one unit. |

After the access procedure has been started, the message to be transmitted is tested whether it is of the d-type. If no, then the access procedure for s-messages is followed, which in FIG. 6 is symbolically shown at block 6-3 by "s", the s-procedure is then started at the input of block 5-4, FIG. 5. If yes, then the transmission of a d-message is effected in the same way as described with reference to FIG. 5 for a s-message, but for the following differences: to give new s-messages priority over d-messages waiting for retransmission, the possibility is provided for s-messages to start once in frame 4 while setting a flag (see FIG. 5, block 5-6, 5-7, 5-8). As this feature is absent for d-packets, in FIG. 6 the blocks corresponding to block 5-6 and 5-7 are absent. In addition, on retransmission of d-packets (path 6-9, 6-11, and 6-10, 6-12, respectively) a test should always be made to determine whether the flag has not been set. If yes, then those d-packets must wait until the flag is again in the non-set state. The procedure of setting and non-setting of the flag is illustrated in FIG. 4.

What is claimed is:

1. A method of transmitting messages formed by data packets between stations via a common communication channel formed by corresponding time slots in consecutive frames of a time-division multiplex system, comprising the steps of each station continuously checking the traffic state of the channel, those stations, which have a data packet ready for transmission, transmitting this packet after they have detected a traffic-free state of the channel, each transmitting station comparing the content of the data packet this station transmits, to the content of the data packet present in the communication channel, to check those packets for mutilations, each station, which has detected multilation of its data packet, terminating the transmission of further data packets of the message, and then those stations, which have detected mutilation of the data packets, adopting a procedure for repeated transmission of the data packets, characterized in that:

each station has an address number which unambiguously identifies this station, after mutilation of data packets has been detected, consecutive numbers are assigned in each station to a first number of consecutive frames, and the number of the frame in which the re-transmission of the data packets of a station starts is equal to at least one portion of the address number of that station.

2. A method as claimed in claim 1, characterized in that after mutilation of the data packets has been detected, consecutive numbers are assigned in all stations to a second number of consecutive frames which precede in time the first number of consecutive frames, and the number of the frame of the second number in which, if necessary, a second retransmission of the data packets of a station starts, is equal to the other portion of the address number of that station.

3. A method as claimed in claim 1, characterized in that each station, which has detected that a data packet has been mutilated, transmits after this detection a disturb signal to prevent mutilation of further data packets before starting to follow the retransmission procedure.

4. A method as claimed in claim 1, characterized in that data packets of first and second types are transmittable, these types differing from each other by their contents, and in the traffic-free state, of consecutive pairs of frames the first and second frames are alternately available for the transmission of a packet of the first and second type, respectively.

5. A method as claimed in any one of the preceding claims, characterized in that data packets of the first and second types are transmittable by the stations, these types differing from each other by their contents, each station can start the transmission of data packets of the first type in a frame located between the instant at which mutilation of a data packet was detected and the subsequent assigning of consecutive numbers of consecutive frames, and in each station a flag is set which indicates the transmission of a data packet of the first type in said frame.

6. A method as claimed in any one of claims 1, 2, 3 or 4, characterized in that after the transmission of the message has been completed, the receiving stations effect an error check, in each station after completion of the transmission of the message consecutive numbers are assigned to a first number of consecutive frames, which number is immediately subsequent to the last data packet of the message, each station which detects an error during the error check transmits an alarm signal in a predetermined frame of the first number, and that station which has sent the erroneously transmitted message starts to follow a procedure for re-transmission in response to the alarm signal.

7. A method of selecting a main station for transmitting synchronizing signals in a system comprising a communication channel and a synchronizing signal for performing the method as claimed in any one of claims 1, 2, 3 or 4 characterized in that in each station the address number of that station is used as a presetting of a counter, the counting position of this counter is always incremented by one unit under the control of a local clock which is nominally the same for all stations until in one of the stations a predetermined final position, which is identical for all stations, is reached, and the station reaching this final state starts to transmit synchronizing signals via the synchronizing channel.

8. A station suitable for performing the method as claimed in claim 1, this station comprising:

a receiver for receiving data packets from the communication channel, a transmitter for transmitting data packets to the communication channel, and a channel comparator for comparing the data packets which are simultaneously present at the transmitter output and in the communication channel, this channel comparator generating a collision signal on detection of inequality between the data packets, characterized in that the station further comprises:

an address store for storing the address number of the station, a frame counter for storing the frame numbers of the first number of frames, a counter comparator for comparing the content of the frame counter to said one portion of the address number, the counter comparator in the event of equality generating an energizing signal, a buffer memory for storing the data packets to be transmitted, and energizing means responsive to said energizing signal for causing the transmitter to transmit the content of the buffer store.

9. A station as claimed in claim 8, characterized by comprising an alarm signal detector for detecting alarm signals in the communication channel, the detector on detecting an alarm signal generating an alarm indication signal, a re-transmission counter, and means for increasing the content of said re-transmission counter in response to collision signals and in response to alarm indication signals.

10. A system of stations having a common communication channel and a common synchronizing channel for performing the method as claimed in claim 7, characterized in that at least one station comprises means for connecting to an external communication channel constituted by a sequence of frames, and the most significant figure of the address number of said one station is one unit higher than the most significant figure of the other stations.

11. A system of stations having a communication channel for performing the method as claimed in claim 1, the content of the data packets being binary encoded and the communication channel comprising a conductor of electromagnetic activity, characterized in that one of the two values of the binary code is represented by the absence of electromagnetic activity.

* * * * *